US008625787B2

(12) United States Patent
Brusilovsky et al.

(10) Patent No.: US 8,625,787 B2
(45) Date of Patent: Jan. 7, 2014

(54) HIERARCHICAL KEY MANAGEMENT FOR SECURE COMMUNICATIONS IN MULTIMEDIA COMMUNICATION SYSTEM

(75) Inventors: Alec Brusilovsky, Du Page, IL (US); Violeta Cakulev, Milburn, NJ (US)

(73) Assignee: Alcatel Lucent, Paris (FR)

( * ) Notice: Subject to any disclaimer, the term of this patent is extended or adjusted under 35 U.S.C. 154(b) by 887 days.

(21) Appl. No.: 12/687,515

(22) Filed: Jan. 14, 2010

(65) Prior Publication Data
US 2011/0170694 A1    Jul. 14, 2011

(51) Int. Cl.
H04L 9/00        (2006.01)

(52) U.S. Cl.
USPC ............. 380/45; 380/262; 380/279; 380/284; 713/171; 726/10

(58) Field of Classification Search
USPC ............. 380/262, 278, 279, 283, 284, 44, 45; 713/171; 726/10
See application file for complete search history.

(56) References Cited

U.S. PATENT DOCUMENTS

| 6,606,706 | B1 | 8/2003 | Li | |
|---|---|---|---|---|
| 2005/0125684 | A1* | 6/2005 | Schmidt | 713/200 |
| 2008/0095070 | A1* | 4/2008 | Chan et al. | 370/254 |
| 2010/0268937 | A1* | 10/2010 | Blom et al. | 713/153 |

FOREIGN PATENT DOCUMENTS

| WO | 03/079607 A1 | 9/2003 |
|---|---|---|
| WO | WO2009070075 | 6/2009 |
| WO | PCT/US2011/020686 | 3/2011 |

OTHER PUBLICATIONS

W. Granzer et al., "Key Set Management in Networked Building Automation Systems Using Multiple Key Servers," IEEE International Workshop on Factory Communication Systems (WFCS). May 2008, pp. 205-214.
3GPP (3rd Generation Partnership Project) Technical Specification TS 33.328, V9.0.0, Dec. 2009, 41 pages.
3GPP (3rd Generation Partnership Project) Technical Specification TS 33.828, V1.6.1, Dec. 2009, 82 pages.
J. Mattsson et al., "MIKEY-Ticket: An Additional Mode of Key Distribution in Multimedia Internet Keying (MIKEY)," Network Working Group, RFC 3830, Oct. 19, 2009, pp. 1-48.
J. Arkko, "MIKEY: Multimedia Internet KEYing," Network Working Group, RFC 3830, Aug. 2004, pp. 1-66.

* cited by examiner

*Primary Examiner* — Eleni Shiferaw
*Assistant Examiner* — Paul Callahan
(74) *Attorney, Agent, or Firm* — Ryan, Mason & Lewis, LLP

(57) ABSTRACT

A method performed in a third computing device comprises: receiving a request from one of a first computing device and a second computing device; and in response to the request, facilitating establishment of a security association between the first computing device and the second computing device such that the first computing device and the second computing device can then facilitate establishment of a security association between first user equipment and second user equipment. The first computing device, the second computing device and the third computing device comprise at least a part of a key management hierarchy wherein the first computing device and the second computing device are on a lower level of the hierarchy and the third computing device is on a higher level of the hierarchy. The first and second computing devices are configured to perform a key management function for respective first and second user equipment.

16 Claims, 5 Drawing Sheets

110

220

300

HIERARCHICAL KEY MANAGEMENT FOR SECURE COMMUNICATIONS IN MULTIMEDIA COMMUNICATION SYSTEM

FIELD OF THE INVENTION

The present invention relates generally to communication security and, more particularly, to a key management protocol for use in securing communications in environments such as a media plane of a multimedia communication system.

BACKGROUND OF THE INVENTION

Existing multimedia applications offered in conventional multimedia communication systems do not adequately support security in the media plane. Existing security proposals in a conventional multimedia communication system such as the Internet Protocol (IP) Multimedia Subsystem (IMS) are based on token-based symmetric key methodologies; managed using a key management service that potentially creates and distributes keys. 3GPP ($3^{rd}$ Generation Partnership Project) Technical Specifications (TS) 33.328 and 33.828, the disclosures of which are incorporated by reference herein, discuss existing proposals for IMS media plane encryption.

Multimedia Internet Keying (MIKEY), as disclosed in RFC 3830, the disclosure of which is incorporated by reference herein, is an example of a media security protocol that is based on pre-shared keys.

An attempted improvement of the MIKEY protocol is referred to as MIKEY-TICKET, and is disclosed in International Patent Publication No. WO2009/070075, the disclosure of which is incorporated by reference herein. MIKEY-TICKET is part of Rel-9 IMS Media Plane Security as disclosed in TS 33.328 and TS 33.828. The MIKEY-TICKET approach uses one or more key management services (KMSs) that issue a voucher (ticket) and key generating information to a user device for use in establishing a session key with another user device. The session key is then used by the user devices to communicate with one another. When, two KMSs are employed (one KMS for each user device), the two KMSs must not only establish a security association with the user devices they are servicing, but the two KMSs must also have a pre-existing one-to-one security association between them in order for the MIKEY-TICKET protocol to work. This may not always be preferable or possible, particularly when each KMS belongs to a different administrative domain.

Thus, a need exists for an improved key management solution for use in securing communications in environments such as a media plane of a multimedia communication system.

SUMMARY OF THE INVENTION

Principles of the invention provide one or more hierarchical key management methodologies for use in securing communications in environments such as, by way of example, a media plane of a multimedia communication system.

By way of one exemplary aspect of the invention, in a communication system wherein a first computing device is configured to perform a key management function for first user equipment and a second computing device is configured to perform a key management function for second user equipment, wherein the first user equipment seeks to initiate communication with the second user equipment, wherein the first computing device and the second computing device do not have a pre-existing security association there between, and wherein a third computing device is configured to perform a key management function and has a pre-existing security association with the first computing device and a pre-existing security association with the second computing device, the third computing device performing a method comprising steps of: receiving a request from one of the first computing device and the second computing device; and in response to the request, facilitating establishment of a security association between the first computing device and the second computing device such that the first computing device and the second computing device can then facilitate establishment of a security association between the first user equipment and the second user equipment.

The first computing device, the second computing device and the third computing device comprise at least a part of a key management hierarchy wherein the first computing device and the second computing device are on a lower level of the hierarchy and the third computing device is on a higher level of the hierarchy.

In one exemplary embodiment, the facilitating step performed by the third computing device further comprises sending a data item and cryptographic information to the first computing device.

The first computing device then sends the data item to the second computing device. The first computing device also computes a key based on the cryptographic information received from the third computing device, and use the computed key to secure the transfer of one or more messages to the second computing device. Alternatively, when the cryptographic information received by the first computing device from the third computing device is a pre-computed key, the first computing device uses the pre-computed key to secure the transfer of one or more messages to the second computing device.

The second computing device then sends the data item to the third computing system.

The third computing system then sends the same cryptographic information to the second computing system that was sent to the first computing system, in response to receiving the data item from the second computing system.

In one example, the second computing device may compute the key based on the cryptographic information received from the third computing device, and use the computed key to secure the transfer of one or more messages to the first computing device. In another example, when the cryptographic information received by the second computing device from the third computing device is the pre-computed key, the second computing device uses the pre-computed key to secure the transfer of one or more messages to the first computing device.

In one embodiment, the first computing device, the second computing device and the third computing device are each key management services, and the data item comprises a ticket or a voucher.

Furthermore, in accordance with the exemplary methodology, a session key and a security association is established between the first user equipment and the second user equipment once the security association is established between the first computing device and the second computing device.

Also, the first computing device may be managed by a different administrative domain than the administrative domain that manages the second computing device.

It is to be appreciated that while principles of the invention are particularly suitable to an Internet Protocol Multimedia Subsystem environment, the invention is not intended to be so limited. That is, principles of the invention are generally applicable to any suitable communication system in which it is desirable to provide key management features.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1A:
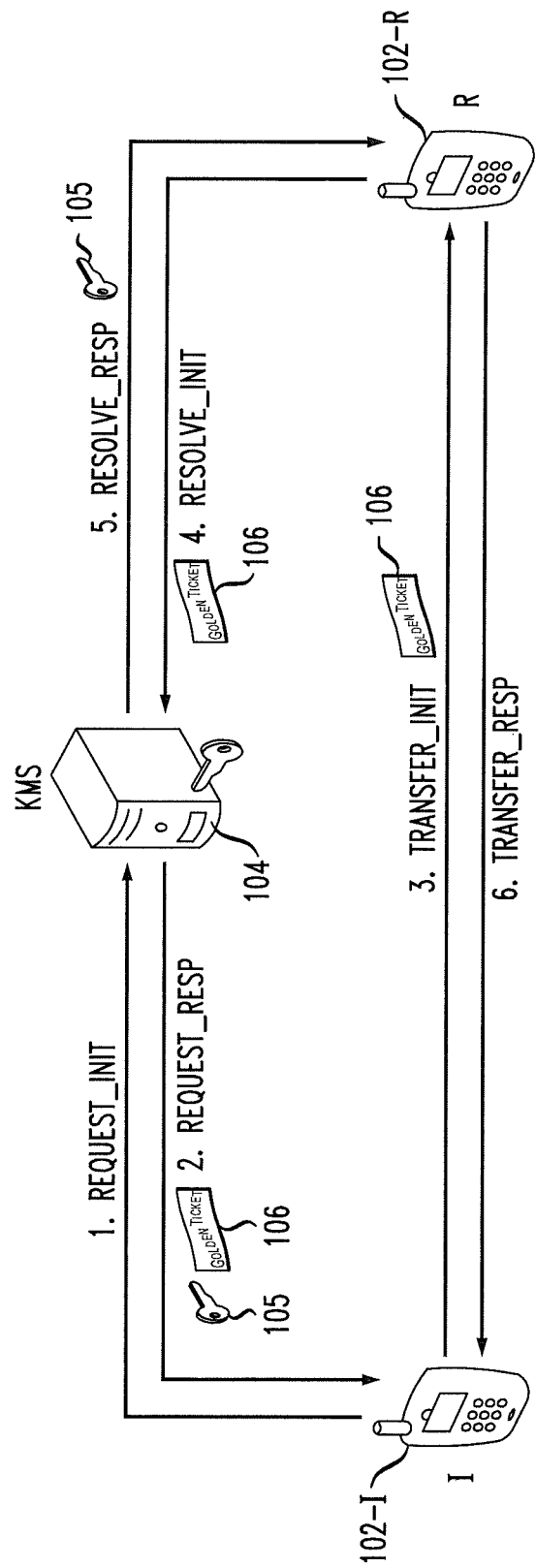
FIG. 1A illustrates a key management architecture and methodology using a single key management service.

The phrase "multimedia communication system" as used herein is generally defined as any communication system capable of transporting two or more types of media involving, but not limited to, text-based data, graphics-based data, voice-based data and video-based data.

The phrase "media plane" as used herein is generally defined as the functional portion of the multimedia communication system in accordance with which the one or more types of media are exchanged between two or more parties in a call session. This is in contrast with a "control plane" which is the functional portion of the multimedia communication system in accordance with which call negotiation/scheduling is performed in order to establish the call session. Examples of media plane applications with which the inventive techniques can be used include, but are not limited to, Voice-over-IP (VoIP), Instant Messaging (IM), Video/Audio IM, and Video Share. It is understood that the media plane contains application layer traffic.

The term "key" as used herein is generally defined as an input to a cryptographic protocol or methodology, for purposes such as, but not limited to, entity authentication, privacy, message integrity, etc.

The phrase "security association" is generally defined as a relationship between two or more entities that is based on some cryptographic or secure data (e.g., one or more keys) generated for the purpose of authentication of one or more of the entities in the relationship, and/or for encryption, decryption, certification, etc.

The phrase "administrative domain" is generally defined as a collection of network elements such as hosts and routers, and the interconnecting network(s), managed by a given administrative authority.

The phrase "user device" is generally defined as a communication device or client device that may be employed by a party (user) to participate in the methodologies described herein and may include, but are not limited to, cellular phones, smart phones, desktop phones, personal digital assistants, laptop computers, personal computers, etc.

The phrase "key management service" is generally defined as a logical element in a cryptographic system that provides functionality related to generation, exchange, storage, safeguarding, use, vetting, and replacement of cryptographic keys. For example, a key management service can be implemented via one or more servers.

The term "ticket" or "voucher" is generally defined as a piece of information that is integrity-protected by the issuing KMS and may include one or more of metadata, identities of participating parties, time of creation, time of validity, sequence number, type of permitted communication usage, etc. The ticket may also include one or more keys or other information that needs to be privacy-protected.

As mentioned above, the MIKEY-TICKET method for key distribution for IMS media security requires one or more key management services (KMSs) to have security associations with one or more user devices, i.e., user equipment (UE), in the communication network. In the case when UEs, which are establishing keys, belong to different administrative domains and different KMSs, these KMSs are required to have pre-existing one-to-one security associations between each other.

In some implementations, such requirements might not be possible to fulfill. Examples for such network architectures are two or more KMSs belonging to two or more administrative domains and either not having pre-existing security associations between each other, or being outright prohibited from having such security associations. Thus, existing solutions require pre-existing one-to-one security associations between KMSs, making resulting key management solutions rather inflexible and resource-hungry. Also, the addition of any extra KMS (i.e., for roaming) will require the addition of a pre-existing security association with any existing KMSs.

FIG. 1A depicts a key management architecture and methodology using a single key management service (KMS). In particular, this is one form of the MIKEY-TICKET approach. As shown in methodology 100, a user device 102-I (initiator) seeks to initiate a communication session with user device 102-R (responder).

In accordance with the MIKEY-TICKET approach, KMS 104 is assumed to have capability to establish a shared key (secure communication) with user device 102-I and, in response to a key request (step 1), provides the user with key generating information 105 and a ticket 106 (step 2) in response to the key request. User device 102-I then transmits the ticket 106 to user device 102-R in a request for communication (step 3).

The user device 102-R, which has pre-established secure communication with KMS 104 (the same KMS that services user device 102*4*), provides the ticket 106 to KMS 104 (step 4). In response thereto, KMS 104 returns (step 5) key generation information 105 to user device 102-R (the same key generating information that KMS 104 sent to user device 102-I in step 2). Based on key generation information 105, both user device 102-I and user device 102-R generate a common session key for use in multimedia communication. User device 102-R sends a response (step 6) to finalize the session key establishment process. Note that the KMS could send the user devices a common session key, already computed, as opposed to key generating information.

Figure 1B:
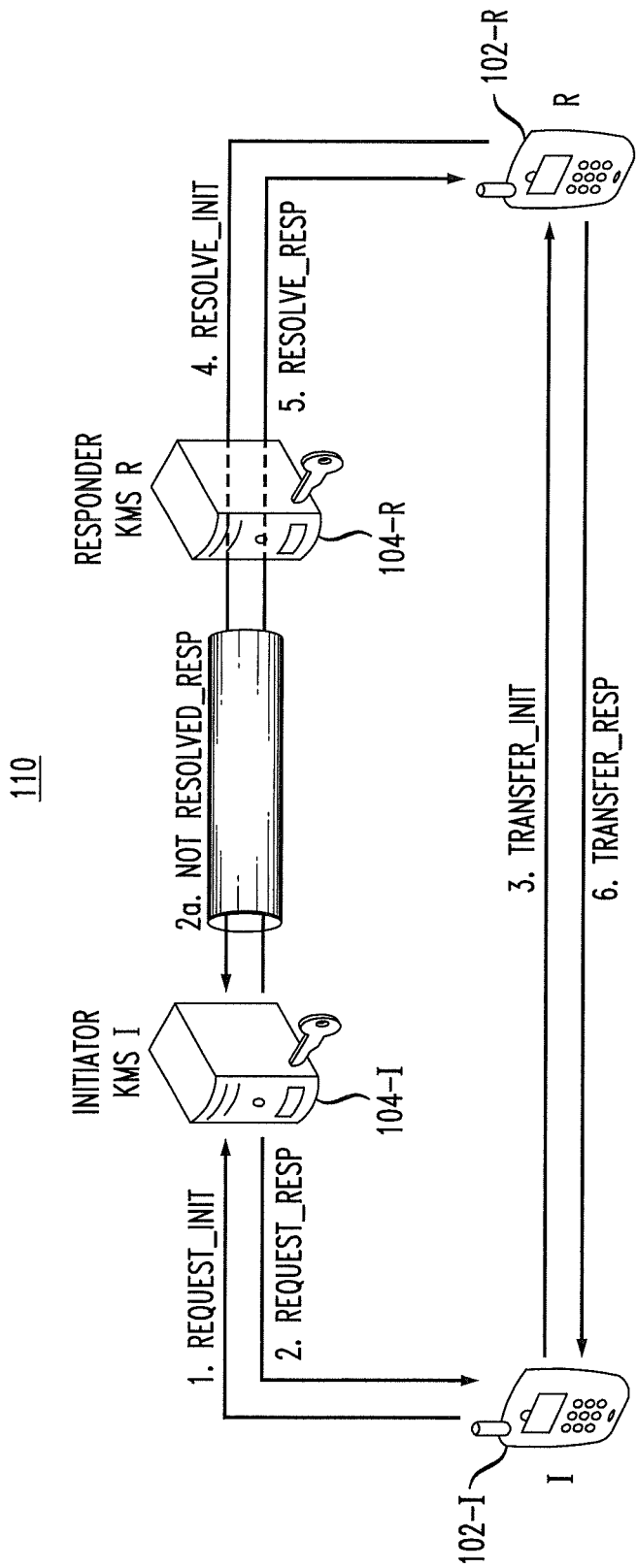
FIG. 1B illustrates a key management architecture and methodology using two key management services.

FIG. 1B depicts a key management architecture and methodology using multiple key management services, e.g., two, in this scenario. This is another form of the MIKEY-TICKET approach. As shown in methodology 110, user device 102-I again seeks to initiate a communication session with user device 102-R. Steps 1 through 6 in FIG. 1B are essentially the same as described above for FIG. 1A. The only difference here is that there are now two KMSs, i.e., KMS 104-I that services user device 102-I and KMS 104-R that services user device 102-R. Additional step 2a as shown in FIG. 1B represents the requirement that, in accordance with the existing MIKEY-TICKET approach, a pre-existing one-to-one security association must exist between the two KMSs for the protocol to work. That is, KMS-R would not be able to resolve the request from 102-R in steps 4 and 5, if such a one-to-one security association did not exist with KMS 104-I prior to the initiator initiating the protocol in step 1. However, as mentioned above, this may not be preferable or in fact, may be prohibited, particularly when KMS 104-I belongs to a different administrative domain than that of KMS 104-R.

To address these and other drawbacks associated with the existing approaches, illustrative principles of the invention provide a hierarchical key management solution which comprises implementing a hierarchical security association and trust model to simplify provisioning of security associations for KMSs, as well as to provide operators' flexibility in deployment of KMSs with the MIKEY-TICKET key distribution method or some other key distribution method. As such, two or more lower hierarchy KMSs belonging to two or more different administrative domains can have pre-existing security associations with an upper hierarchy KMS. Thus, the inventive solution allows the MIKEY-TICKET method or the like to be improved by introducing multiple levels of KMS hierarchy, allowing more flexible deployment of key distribution features in distinct networks (and thus administrative domains) of a multimedia communication system, i.e., a network operators' part of the communication system and an enterprises' part of the communication system.

Figure 2A:
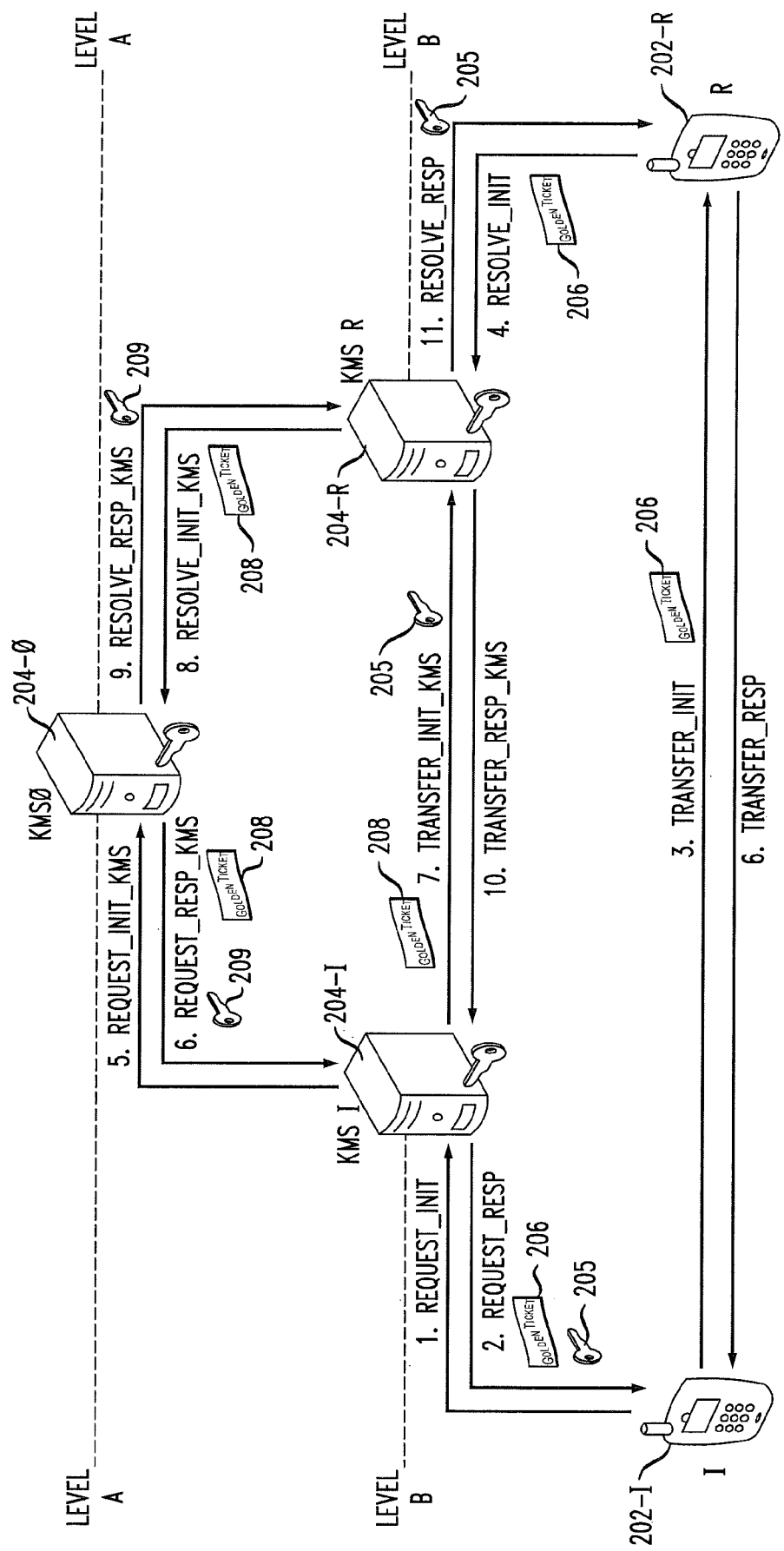
FIG. 2A illustrates a hierarchical key management architecture and methodology according to an embodiment of the invention.

FIG. 2A illustrates a hierarchical key management architecture and methodology according to an embodiment of the invention. It is to be understood that user devices 202-I (initiator) and 202-R (responder) in FIG. 2A are the same or similar to users device 102-I and user device 102-R, respectively, in FIGS. 1A and 1B, and function in the same or similar manners except as otherwise noted. Likewise, KMS 204-I and KMS 204-R are the same or similar as KMS 104-I and KMS 104-R, respectively, with regard to the user devices, and function in the same or similar manners as otherwise noted. An important difference, however, between KMS 204-I/KMS 204-R and KMS 104-I/KMS 104-R is that, at the start of the initiation request (step 1) in FIG. 2A, KMS 204-I and KMS 204-R do not have an existing security association (trust) between them. However, in accordance with an embodiment of the invention, there is a hierarchical security association between KMS 204-I and KMS 204-0, as well as between KMS 204-R and KMS 204-0. That is, in accordance with an embodiment of the invention, KMSs at level B in the hierarchy are not required to have pre-existing one-to-one security associations with each other since each individual KMS at level B (lower hierarchical level) has or establishes a security association with a KMS at level A (a higher or upper hierarchical level). It is assumed, however, that the initiator UE (202-I) has or establishes a security association with its KMS I (204-I), and responder UE (202-R) has or establishes a similar security association with KMS R (204-R).

It is to be understood that while FIG. 2A shows a two-level hierarchy with two KMSs at a lower level and one KMS at an upper level, principles of the invention contemplate hierarchies having more than two levels with more than the given number of KMSs shown in FIG. 2A at each level. Thus, adding a KMS at a given level does not require that the added KMS establish security associations with each of the other KMS at that same level, but rather only requires that the added KMS establish a security association with an upper hierarchy KMS.

Accordingly, in the embodiment illustrated in FIG. 2A, the following steps occur. Note that below: user device 202-I is referred to as "Initiator UE" or "Initiator" or "I;" user device 202-R is referred to as "Responder UE" or "Responder" or "R;" KMS 204-I is referred to as "KMS I;" KMS 204-R is referred to as "KMS R;" and KMS 204-0 is referred to as "KMS0." Also note that, unless otherwise specified or modified by the enhancements disclosed herein, standard MIKEY_TICKET techniques may be applied in the message transfers.

Step 1. Initiator UE sends a REQUEST_INIT message containing responder's identity to the KMS I.

Step 2. KMS I replies to Initiator with a REQUEST_RESP message containing a session key 205 (or, as mentioned above; key generating information for generating the session key) and a ticket 206.

Step 3. Initiator sends a TRANSFER_INIT message containing the ticket 206 received from KMS I to the Responder.

Step 4. Responder forwards the ticket 206 received from Initiator in a RESOLVE_INIT message to the KMS R.

Step 5. KMS I sends a REQUEST_INIT_KMS message to KMS0.

Step 6. KMS0 responds to KMS I with an inter-KMS ticket 208 and inter-KMS key 209 (or key generating information for generating the inter-KMS key) in a REQUEST_RESP_KMS message.

Step 7. KMS I transfers the inter-KMS ticket 208 received from KMS0 to KMS R in a TRANSFER_INIT_KMS message. In this message, KMS I also transfers the session key 205 (or key generating information) to KMS R.

Step 8. KMS R forwards inter-KMS ticket 208 received from KMS I to KMS0 in a RESOLVE_INIT_KMS message.

Step 9. KMS0 responds to KMS R with inter-KMS key 209 in a RESOLVE_RESP_KMS message.

Step 10. KMS R confirms its receipt of the inter-KMS key 209 by sending a TRANSFER_RESP_KMS message to KMS I, thus finalizing the key exchange. At this point, the security association between KMS I and KMS R is established.

Step 11. KMS R sends a RESOLVE_RESP message with the session key 205 to Responder.

Step 12. Responder finalizes key exchange by sending a TRANSFER_RESP message to Initiator.

Note that key 205 is the session key needed for the actual media session between I and R; KMS I sends key 205 to KMS R, and KMS R sends key 205 to R. Key 209 is the key which allows KMS I to establish a security association with KMS R after initiation of the communication session by I, thus alleviating the requirement that KMS I and KMS R have a pre-existing one-to-one security association. Note that no media is being protected by this inter-KMS key, only signaling between KMS I and KMS R.

Figure 2B:
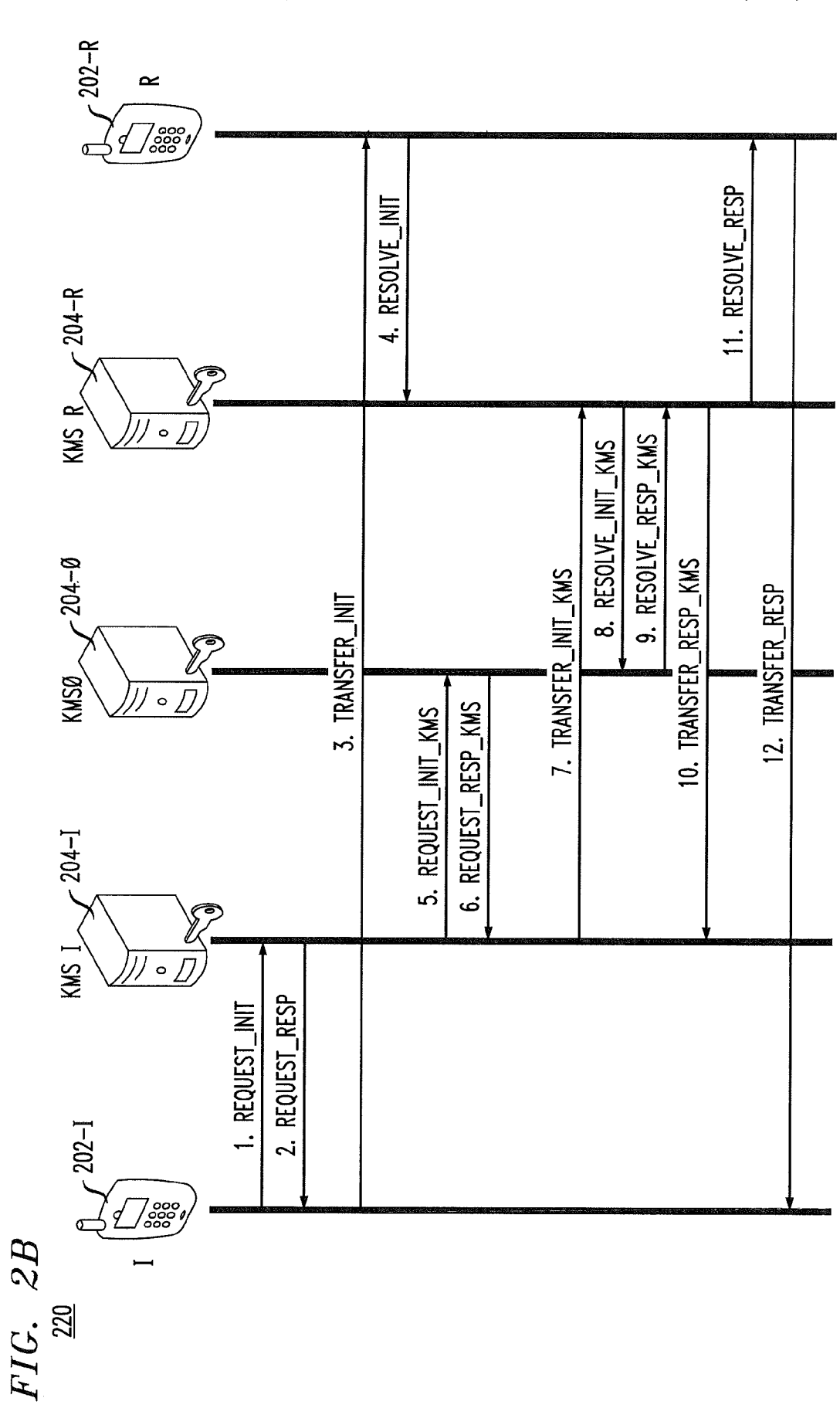
FIG. 2B illustrates hierarchical key management messaging protocol according to an embodiment of the invention.

FIG. 2B illustrates the same steps as described above in the context of FIG. 2A but shows the actual message ordering in a hierarchical key management messaging protocol 220. Thus, in summary, KMS I and KMS R do not have security associations (SAs) with each other, but KMS I and KMS R do have SAs with KMS0. The key exchange is initiated by UE I; it sends a request to KMS I to securely connect with UE R, which is associated with KMS R. KMS I to KMS R have to establish an SA with each other. To do this, KMS I and KMS R use KMS0 with which both of them, KMS I and KMS R, have pre-configured SAs. Note that the SA between KMS I and KMS R is considered as being established once KMS R sends the confirmation message to KMS I in step 10. Also note that KMS I forwards (in the step #7) the session key previously given to UE I (step #2) to KMS R. After that KMS R can forward that session key to UE R in the step #11. Now UE I and UE R both have the session key and a security association, and can exchange media protected by the key.

An alternative embodiment to the embodiment described above in the context of FIGS. 2A and 2B is the approach in which KMS R sends a REQUEST_INIT_KMS message to KMS0 and receives inter-KMS ticket 208 and inter-KMS key 209 (or key generating information for generating the inter-KMS key) in a REQUEST_RESP_KMS message. REQUEST_INIT_KMS and REQUEST_RESP_KMS messages are followed by TRANSFER and RESOLVE messages (i.e., KMS R sends TRANSFER_INIT_KMS message to KMS I, which in turn exchanges RESOLVE_INIT_KMS/RESOLVE_RESP_KMS messages with the KMS0 before it returns TRANSFER_RESP_KMS message to the KMS R).

It is to be understood that while the embodiments above illustratively describe the hierarchical key management solutions of the invention in the context of the MIKEY-TICKET key distribution methodology, such inventive solutions are not limited to usage in the MIKEY-TICKET protocol. That is, such a hierarchical key management service architecture and methodology of the invention can be implemented in any other suitable key management scenario in a communication system.

Also, note that the inventive hierarchical KMS architecture described herein advantageously allows scaling horizontally (i.e., adding more KMSs on the same level), as well as scaling vertically (i.e., adding levels of hierarchy) without changing of the base protocol.

Accordingly, by way of one exemplary aspect of the invention, in a communication system wherein a first computing device (e.g., KMS I) is configured to perform a key management function (e.g., service) for first user equipment (e.g., UE I) and a second computing device (e.g., KMS R) is configured to perform a key management function for second user equipment (e.g., UE R), wherein the first user equipment seeks to initiate communication with the second user equipment, wherein the first computing device and the second computing device do not have a pre-existing security association there between, and wherein a third computing device (e.g., KMS0) is configured to perform a key management function and has a pre-existing security association with the first computing device and a pre-existing security association with the second computing device, the third computing device performing a method comprising steps of: receiving a request from the first computing device (e.g., step 5); and in response to the request, facilitating establishment of a security association between the first computing device and the second computing device (steps 6 through 10) such that the first computing device and the second computing device can then facilitate establishment of a security association between the first user equipment and the second user equipment. Note that in an alternative embodiment, the third computing device may receive the request from the second computing device, and thus the second computing device (rather than the first computing device) initiates establishment of the inter-KMS security association.

The first computing device, the second computing device and the third computing device comprise at least a part of a key management hierarchy wherein the first computing device and the second computing device are on a lower level (e.g., level B) of the hierarchy and the third computing device is on a higher level (e.g., level A) of the hierarchy.

In one exemplary embodiment, the facilitating step performed by the third computing device (e.g., KMS0) further comprises sending a data item (e.g., ticket 208) and cryptographic information (key or key generating information 209) to the first computing device (e.g., KMS I). The first computing device then sends the data item to the second computing device (e.g., KMS R). The second computing device then sends the data item to the third computing system. The third computing system then sends the same cryptographic information to the second computing system that was sent to the first computing system, in response to receiving the data item from the second computing system. The second computing device then sends a response to the first computing device. Furthermore, a session key and a security association between the first user equipment (e.g., UE I) and the second user equipment (e.g., UE R) is established once the security association is established between the first computing device and the second computing device.

Figure 3:
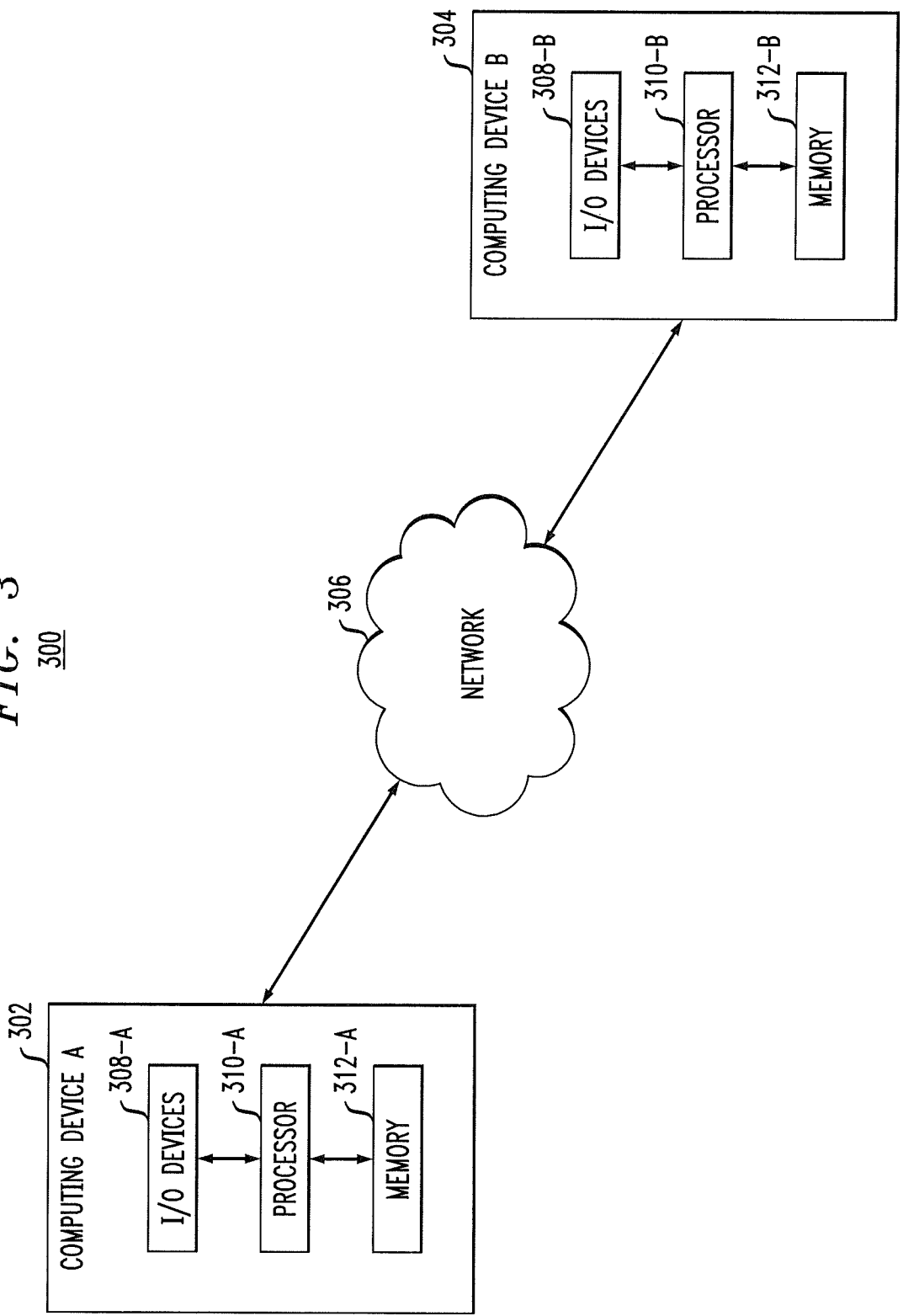
FIG. 3 illustrates a generalized hardware architecture of a part of a communication system and computing devices suitable for implementing one or more of the methodologies and protocols according to embodiments of the invention.

Referring now lastly to FIG. 3, illustrated is generalized hardware architecture 300 of a communication system environment and computing devices suitable for implementing a key management protocol between two entities according to the present invention. While FIG. 3 shows only computing devices for two entities A and B, it is to be understood that other entities can have the same configuration. Thus, in terms of the key management protocols described above, the two entities A and B may be any two entities shown in FIGS. 2A and 2B, i.e.: initiator 202-I and responder 202-R; a KMS and either of the initiator and the responder; any two KMSs of the KMS hierarchy; etc. Thus, for the sake of simplicity, all the computing devices (communication devices and servers) that may participate in the protocols of the invention are not shown in FIG. 3.

As shown, A's computing device designated 302 and B's computing device designated 304 are coupled via a network 306. The network may be any network across which the devices are able to communicate, for example, as in the embodiments described above, the network 306 could include a publicly-accessible wide area communication network such as a cellular communication network operated by a network operator (e.g., Verizon, AT&T, Sprint). Network 306 may also include a private enterprise network. However, the invention is not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. However, one or more of the devices could be servers. Thus, it is to be understood that the communication protocol of the present invention is not limited to the case where the computing systems are client and server, respectively, but instead is applicable to any form of computing devices.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 3 generally illustrates an exemplary architecture for each computer system communicating over the network. As shown, device 302 comprises I/O devices 308-A, processor 310-A, and memory 312-A. Device 304 comprises I/O devices 308-B, processor 310-B, and memory 312-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   in a communication system wherein a first computing device is configured to perform a key management function for first user equipment and a second computing device is configured to perform a key management function for second user equipment, wherein the first user equipment seeks to initiate communication with the second user equipment, wherein the first computing device and the second computing device do not have a pre-existing security association there between, and wherein a third computing device is configured to perform a key management function and has a pre-existing security association with the first computing device and a pre-existing security association with the second computing device, the third computing device performing steps of:
   receiving a request from one of the first computing device and the second computing device;
   in response to the request, facilitating establishment of a first security association between the first computing device and the second computing device such that the first computing device and the second computing device then facilitate establishment of a second security association different than the first security association between the first user equipment and the second user equipment; and
   sending cryptographic information and a data item comprising a ticket or voucher to the first computing device,
   the first computing device and the second computing device being on a lower level of a key management hierarchy and the third computing device being on a higher level of the hierarchy.

2. The method of claim 1, wherein the first computing device sends the data item to the second computing device.

3. The method of claim 1, wherein the first computing device computes a key based on the cryptographic information received from the third computing device, and uses the computed key to secure transfer of one or more messages to the second computing device.

4. The method of claim 1, wherein the cryptographic information received by the first computing device from the third computing device is a pre-computed key, and the first computing device uses the pre-computed key to secure transfer of one or more messages to the second computing device.

5. The method of claim 2, wherein the second computing device sends the data item to the third computing device.

6. The method of claim 5, wherein the third computing device sends the same cryptographic information to the second computing device that was sent to the first computing device, in response to receiving the data item from the second computing device.

7. The method of claim 6, wherein the second computing device computes the key based on the cryptographic information received from the third computing device, and uses the computed key to secure transfer of one or more messages to the first computing device.

8. The method of claim 6, wherein the cryptographic information received by the second computing device from the third computing device is the pre-computed key, and the second computing device uses the pre-computed key to secure transfer of one or more messages to the first computing device.

9. The method of claim 1, wherein the first computing device, the second computing device and the third computing device are each key management services.

10. The method of claim 1, wherein a session key and the second security association is established between the first user equipment and the second user equipment once the first security association is established between the first computing device and the second computing device.

11. The method of claim 1, wherein the communication system comprises an Internet Protocol Multimedia Subsystem.

12. The method of claim 1, wherein the first computing device is managed by a different administrative domain than the administrative domain that manages the second computing device.

13. An apparatus, comprising:
   in a communication system wherein a first computing device is configured to perform a key management function for first user equipment and a second computing device is configured to perform a key management function for second user equipment, wherein the first user equipment seeks to initiate communication with the second user equipment, wherein the first computing device and the second computing device do not have a pre-existing security association there between, and wherein a third computing device is configured to perform a key management function and has a pre-existing security association with the first computing device and a pre-existing security association with the second computing device, the third computing device comprising:
   a memory; and
   at least one processor coupled to the memory and configured to:
   receive a request from one of the first computing device and the second computing device;
   in response to the request, facilitate establishment of a first security association between the first computing device and the second computing device such that the first computing device and the second computing device then facilitate establishment of a second security association different than the first security association between the first user equipment and the second user equipment; and
   send cryptographic information and a data item comprising a ticket or voucher to the first computing device,
   the first computing device and the second computing device being on a lower level of a key management hierarchy and the third computing device being on a higher level of the hierarchy.

14. The apparatus of claim 13, wherein a session key and the second security association is established between the first user equipment and the second user equipment once the first security association is established between the first computing device and the second computing device.

15. The apparatus of claim 13, wherein the first computing device is managed by a different administrative domain than the administrative domain that manages the second computing device.

16. An article of manufacture, comprising:

in a communication system wherein a first computing device is configured to perform a key management function for first user equipment and a second computing device is configured to perform a key management function for second user equipment, wherein the first user equipment seeks to initiate communication with the second user equipment, wherein the first computing device and the second computing device do not have a pre-existing security association there between, and wherein a third computing device is configured to perform a key management function and has a pre-existing security association with the first computing device and a pre-existing security association with the second computing device, a non-transitory processor-readable storage medium storing one or more software programs which when executed by a processor associated with the third computing device perform steps of:

receiving a request from one of the first computing device and the second computing device;

in response to the request, facilitating establishment of a first security association between the first computing device and the second computing device such that the first computing device and the second computing device then facilitate establishment of a second security association different than the first security association between the first user equipment and the second user equipment; and sending cryptographic information and a data item comprising a ticket or voucher to the first computing device, the first computing device and the second computing device being on a lower level of a key management hierarchy and the third computing device being on a higher level of the hierarchy.

* * * * *